US008724068B2

(12) United States Patent
Azuma et al.

(10) Patent No.: US 8,724,068 B2
(45) Date of Patent: May 13, 2014

(54) LIQUID CRYSTAL DISPLAY DEVICE

(75) Inventors: Hiroshi Azuma, Fukaya (JP); Hideyuki Takahashi, Fukaya (JP)

(73) Assignee: Japan Display Inc., Tokyo (JP)

( * ) Notice: Subject to any disclaimer, the term of this patent is extended or adjusted under 35 U.S.C. 154(b) by 100 days.

(21) Appl. No.: 13/276,675

(22) Filed: Oct. 19, 2011

(65) Prior Publication Data

US 2012/0162579 A1 Jun. 28, 2012

(30) Foreign Application Priority Data

Dec. 24, 2010 (JP) ................................ 2010-288635

(51) Int. Cl.
*G02F 1/1343* (2006.01)

(52) U.S. Cl.
USPC .......................................... 349/146; 346/145

(58) Field of Classification Search
USPC ................................................ 349/146, 145
See application file for complete search history.

(56) References Cited

U.S. PATENT DOCUMENTS

| | | | | |
|---|---|---|---|---|
| 6,879,357 | B2 * | 4/2005 | Mima | 349/110 |
| 7,804,569 | B2 * | 9/2010 | Sohn et al. | 349/139 |
| 2005/0078253 | A1 * | 4/2005 | Kim et al. | 349/139 |

FOREIGN PATENT DOCUMENTS

| | | | |
|---|---|---|---|
| JP | 11-174453 | | 7/1999 |
| JP | 2001-330862 | A | 11/2001 |
| JP | 2005-25202 | A | 1/2005 |
| JP | 2005-70151 | A | 3/2005 |
| JP | 2005-316331 | A | 11/2005 |
| JP | 2008-96815 | A | 4/2008 |
| JP | 2009-300555 | | 12/2009 |
| JP | 2010-145871 | A | 7/2010 |

OTHER PUBLICATIONS

Japanese Office Action issued Jan. 8, 2013 in Patent Application No. 2010-288635 with English Translation.
U.S. Appl. No. 13/404,069, filed Feb. 24, 2012, Takahashi.

* cited by examiner

*Primary Examiner* — Edward Glick
*Assistant Examiner* — Mark Teets
(74) *Attorney, Agent, or Firm* — Oblon, Spivak, McClelland, Maier & Neustadt, L.L.P.

(57) ABSTRACT

According to one embodiment, a liquid crystal display device includes a first substrate including a gate line extending in a first direction, a source line including an oblique line portion extending in a third direction which crosses at an acute angle a second direction perpendicular to the first direction, a pixel electrode including an oblique electrode portion extending in the third direction, and a first alignment film covering the pixel electrode, a second substrate including a counter-electrode which is opposed to the pixel electrode, and a second alignment film covering the counter-electrode, and a liquid crystal layer held between the first substrate and the second substrate. A first rubbing direction of the first alignment film is a direction which crosses the third direction at an acute angle, and an angle formed between the first rubbing direction and the third direction is 3.6° or more.

11 Claims, 7 Drawing Sheets

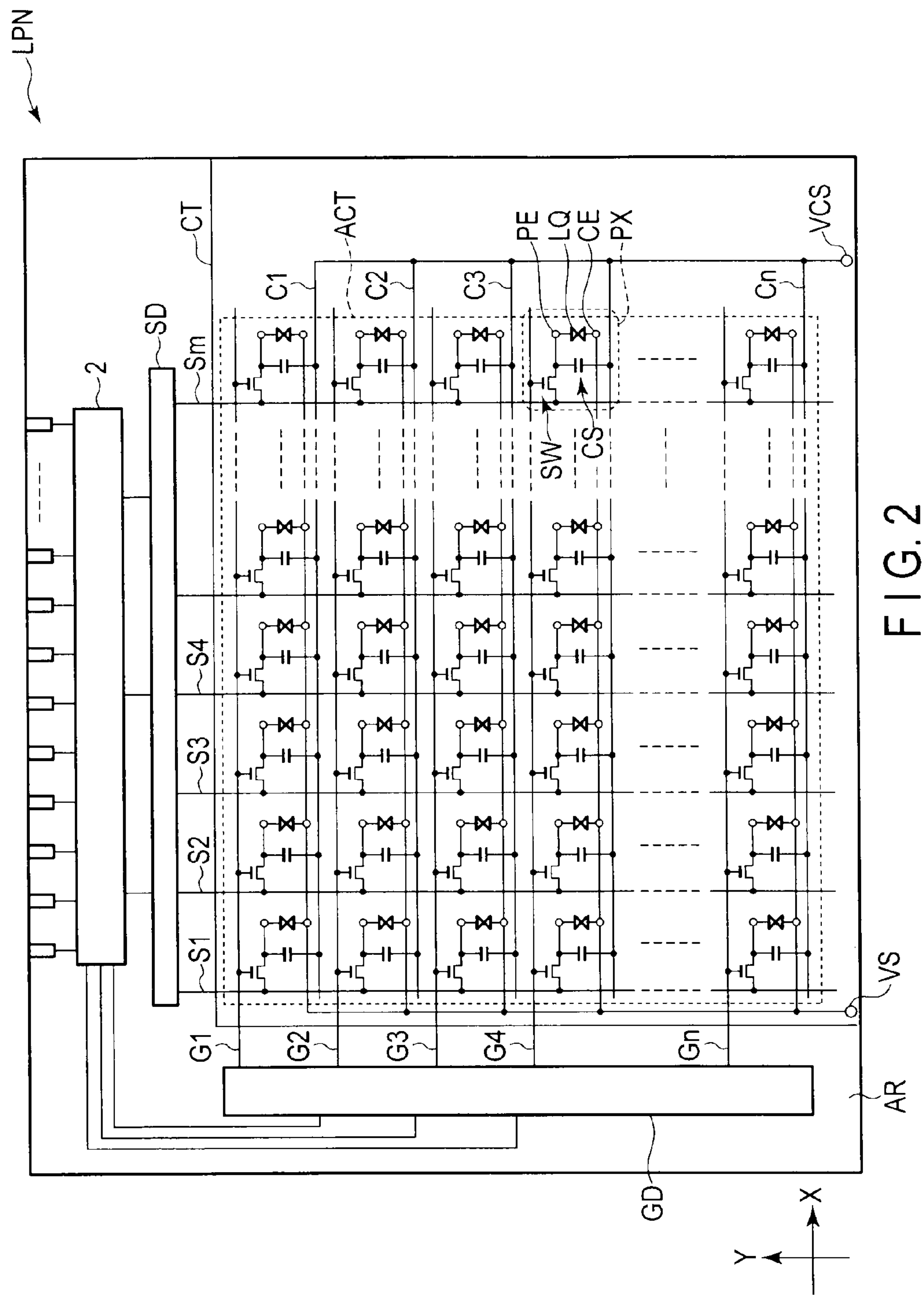
F I G. 2

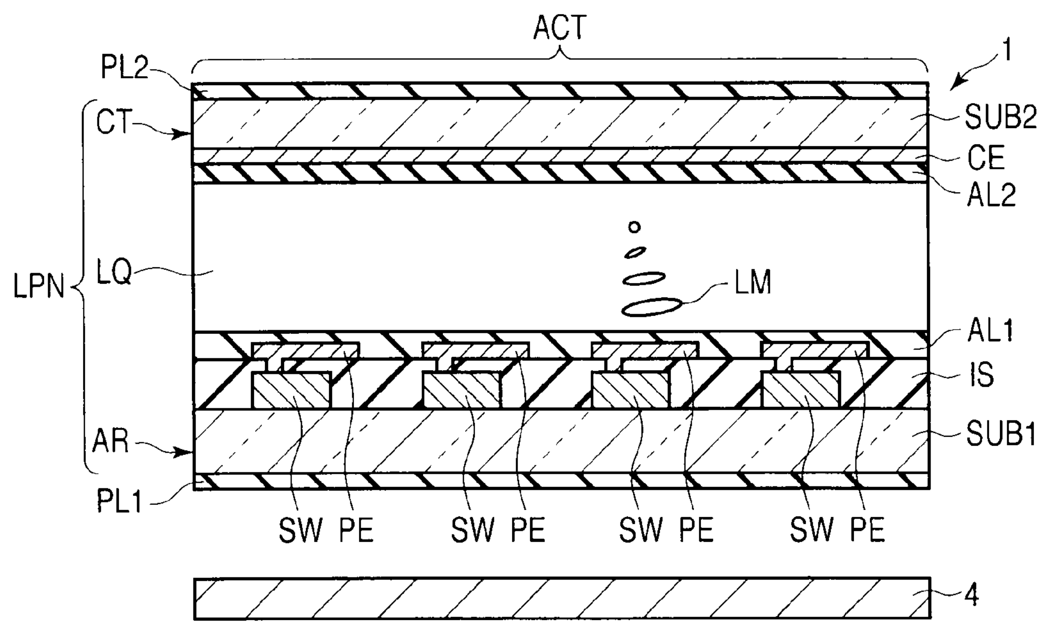
F I G. 3

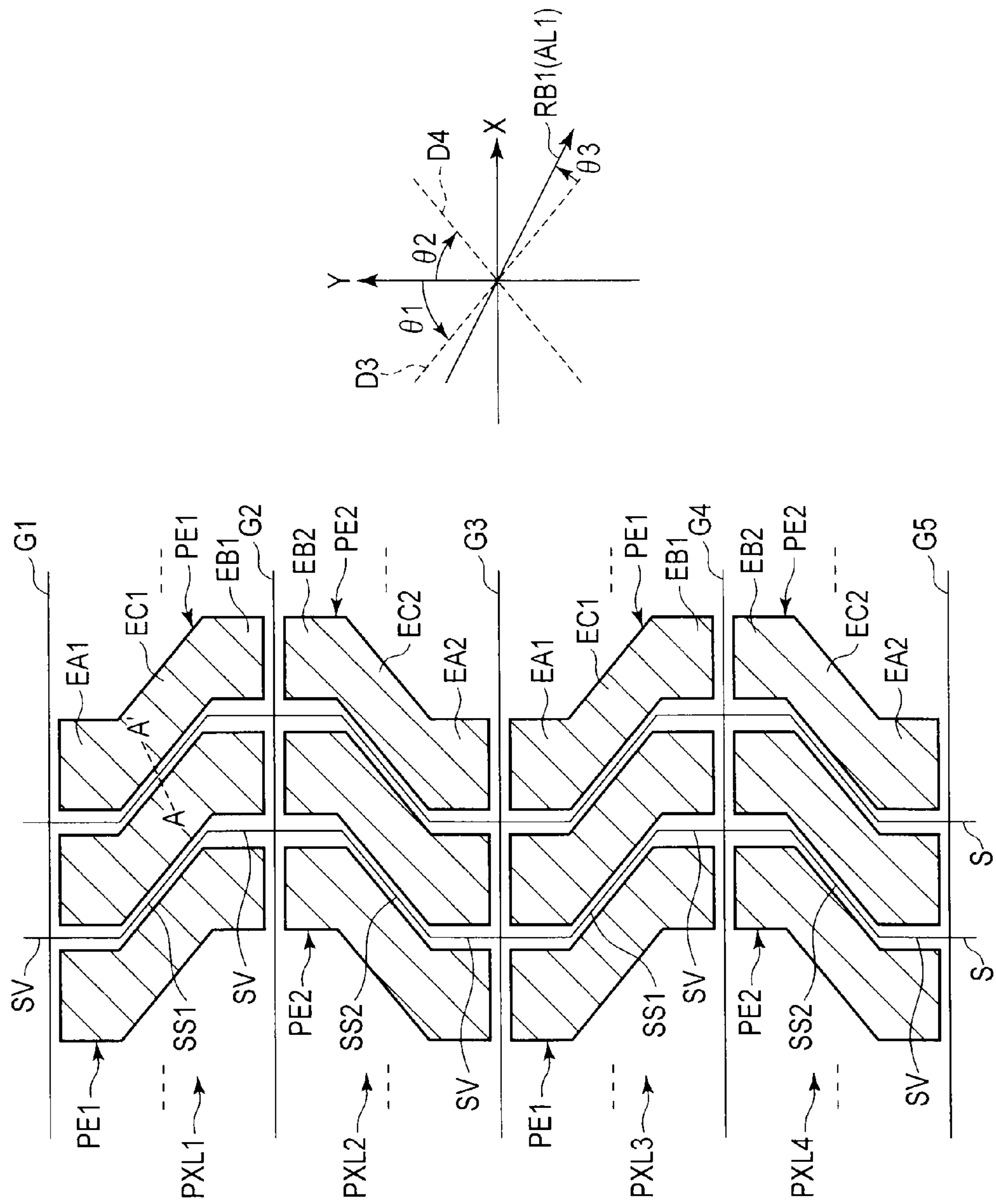
F I G. 4

LIQUID CRYSTAL DISPLAY DEVICE

CROSS-REFERENCE TO RELATED APPLICATIONS

This application is based upon and claims the benefit of priority from prior Japanese Patent Application No. 2010-288635, filed Dec. 24, 2010, the entire contents of which are incorporated herein by reference.

FIELD

Embodiments described herein relate generally to a liquid crystal display device.

BACKGROUND

By virtue of such features as light weight, small thickness and low power consumption, flat-panel display devices, which are represented by liquid crystal display devices, have been used in various fields as display devices of OA equipment such as personal computers, information terminals, timepieces, TVs, etc. In particular, by virtue of high responsivity, liquid crystal display devices using thin-film transistors are widely used as monitors of mobile terminals, computers, etc., which display a great deal of information.

In the meantime, liquid crystal display devices of various modes, such as a twisted nematic (TN) mode and an in-plane switching (IPS) mode, include alignment films which are subjected to rubbing treatment, in order to initially align liquid crystal molecules. The rubbing direction at a time of subjecting the alignment film to rubbing treatment has been variously studied.

BRIEF DESCRIPTION OF THE DRAWINGS

FIG. 2 is a view which schematically illustrates a structure and an equivalent circuit of a liquid crystal display panel shown in FIG. 1.

FIG. 3 is a cross-sectional view which schematically shows the structure of the liquid crystal display device shown in FIG. 1.

FIG. 4 is a top view which schematically shows a structure of an array substrate, which is applicable to the liquid crystal display device of the present embodiment.

DETAILED DESCRIPTION

Figure 1:
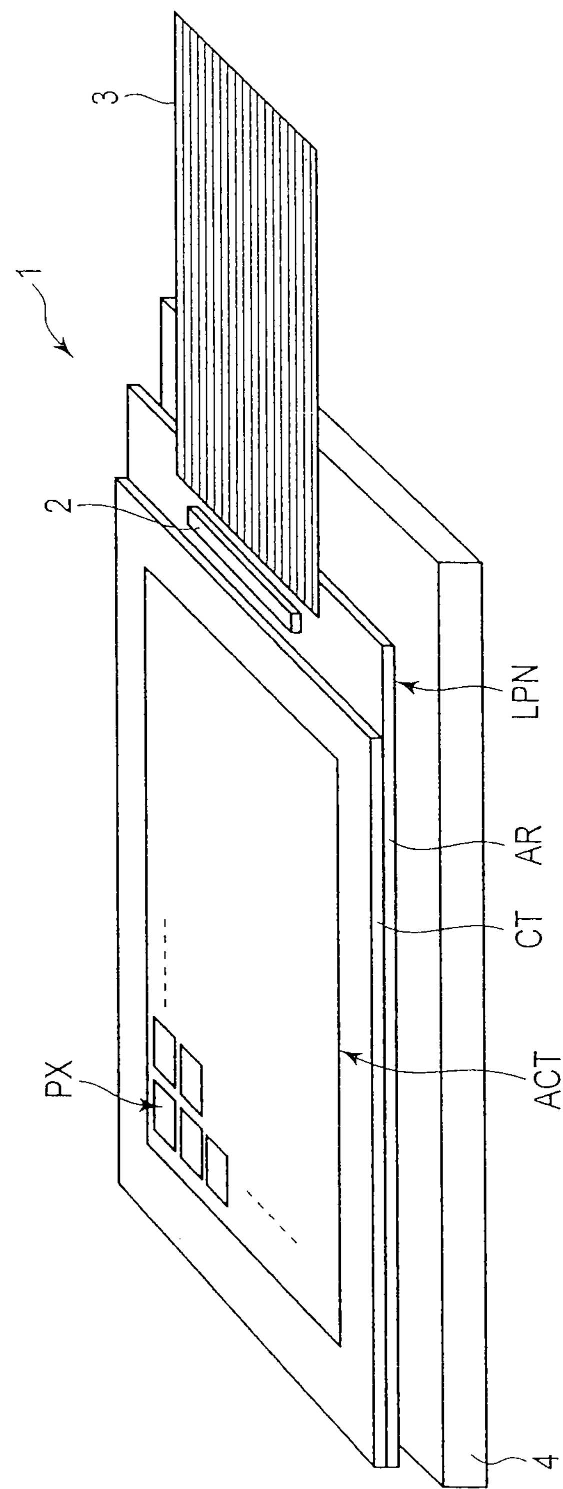
FIG. 1 schematically shows a structure of a liquid crystal display device according to an embodiment.

In general, according to one embodiment, a liquid crystal display device includes a first substrate including a gate line extending in a first direction, a source line including an oblique line portion extending in a third direction which crosses at an acute angle a second direction perpendicular to the first direction, a pixel electrode including an oblique electrode portion extending in the third direction, and a first alignment film covering the pixel electrode; a second substrate including a counter-electrode which is opposed to the pixel electrode, and a second alignment film covering the counter-electrode; and a liquid crystal layer held between the first substrate and the second substrate, wherein a first rubbing direction of the first alignment film is a direction which crosses the third direction at an acute angle, and an angle formed between the first rubbing direction and the third direction is 3.6° or more.

According to another embodiment, a liquid crystal display device includes a first pixel line which is composed of a plurality of first pixel electrodes arranged in a first direction, each of the first pixel electrodes including a first oblique electrode portion extending in a third direction which crosses a second direction, which is perpendicular to the first direction, at an acute angle counterclockwise relative to the second direction; a second pixel line which neighbors the first pixel line and is composed of a plurality of second pixel electrodes arranged in the first direction, each of the second pixel electrodes including a second oblique electrode portion extending in a fourth direction which crosses the second direction at an acute angle clockwise relative to the second direction; a first alignment film covering each of the first pixel electrodes and each of the second pixel electrodes; a counter-electrode which is opposed to each of the first pixel electrodes and each of the second pixel electrodes; a second alignment film covering the counter-electrode; and a liquid crystal layer held between the first alignment film and the second alignment film, wherein a first rubbing direction of the first alignment film is a direction which crosses the third direction at an acute angle counterclockwise relative to the third direction, and an angle formed between the first rubbing direction and the third direction is 3.6° or more.

According to another embodiment, a liquid crystal display device includes a first pixel line which is composed of a plurality of first pixel electrodes arranged in a first direction, each of the first pixel electrodes including a first oblique electrode portion extending in a third direction which crosses a second direction, which is perpendicular to the first direction, at an acute angle counterclockwise relative to the second direction; a second pixel line which neighbors the first pixel line and is composed of a plurality of second pixel electrodes arranged in the first direction, each of the second pixel electrodes including a second oblique electrode portion extending in a fourth direction which crosses the second direction at an acute angle clockwise relative to the second direction; a first alignment film covering each of the first pixel electrodes and each of the second pixel electrodes; a counter-electrode which is opposed to each of the first pixel electrodes and each of the second pixel electrodes; a second alignment film covering the counter-electrode; and a liquid crystal layer held between the first alignment film and the second alignment film, wherein a first rubbing direction of the first alignment film is a direction which crosses the fourth direction at an acute angle clockwise relative to the fourth direction, and an angle formed between the first rubbing direction and the fourth direction is 3.6° or more.

Embodiments will now be described in detail with reference to the accompanying drawings. In the drawings, structural elements having the same or similar functions are denoted by like reference numerals, and an overlapping description is omitted.

FIG. 1 is a view which schematically shows a structure of a liquid crystal display device 1 according to an embodiment.

Specifically, the liquid crystal display device 1 includes an active-matrix-type liquid crystal display panel LPN, a driving IC chip 2 and a flexible wiring board 3 which are connected to the liquid crystal display panel LPN, and a backlight 4 which illuminates the liquid crystal display panel LPN.

The liquid crystal display panel LPN is configured to include an array substrate AR which is a first substrate, a counter-substrate CT which is a second substrate that is disposed to be opposed to the array substrate AR, and a liquid crystal layer (not shown) which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The backlight 4, in the example illustrated, is disposed on the back side of the array substrate AR. Various modes are applicable to the backlight 4. As the backlight 4, use may be made of either a backlight which utilizes a light-emitting diode as a light source, or a backlight which utilizes a cold cathode fluorescent lamp (CCFL) as a light source. A description of the detailed structure of the backlight 4 is omitted.

FIG. 2 is a view which schematically shows a structure and an equivalent circuit of the liquid crystal display panel LPN shown in FIG. 1.

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend in a first direction X. The source lines S cross the gate lines G and storage capacitance lines C. In the example illustrated, each source line S has a straight-line shape. However, in this example, the equivalent circuit is illustrated, and the actual shape of the source line is not shown.

Each of the gate lines G is led out of the active area ACT and is connected to a gate driver GD. Each of the source lines S is led out of the active area ACT and is connected to a source driver SD. At least parts of the gate driver GD and source driver SD are formed on the array substrate AR and are connected to a driving IC chip 2 which incorporates a controller.

Each of the pixels PX includes a switching element SW, a pixel electrode PE and a counter-electrode CE. A storage capacitance CS is formed, for example, between the storage capacitance line C and the pixel electrode PE.

In the present embodiment, the liquid crystal display panel LPN is configured such that the array substrate AR includes the pixel electrodes PE and the counter-substrate CT includes the counter-electrode CE. Liquid crystal molecules of the liquid crystal layer LQ are switched by mainly using an electric field which is produced between the pixel electrodes PE and the counter-electrode CE. The electric field, which is produced between the pixel electrodes PE and the counter-electrode CE, is a vertical electric field which is substantially perpendicular to the major surface of the array substrate AR or the major surface of the counter-substrate CT.

The switching element SW is composed of, for example, an n-channel thin-film transistor (TFT). The switching element SW is electrically connected to the gate line G and source line S. In the active area ACT, an (m×n) number of switching elements SW are formed.

The pixel electrode PE is electrically connected to the switching element SW. In the active area ACT, an (m×n) number of pixel electrodes PE are formed. The counter-electrode CE has, for example, a common potential, and is disposed common to the plural pixel electrodes PE via the liquid crystal layer LQ. The counter-electrode CE is electrically connected to a power supply module VS which is formed on the array substrate AR via an electrically conductive member (not shown). The storage capacitance line C is electrically connected to a voltage application module VCS to which a storage capacitance voltage is applied.

FIG. 3 is a cross-sectional view which schematically shows the structure of the liquid crystal display device 1 shown in FIG. 1. In the description below, a TN mode liquid crystal display device is described by way of example.

The array substrate AR is formed by using a first insulative substrate SUB1 having light transmissivity, such as a glass substrate or a plastic substrate. The array substrate AR includes switching elements SW, pixel electrodes PE and a first alignment film AL1 on that side of the first insulative substrate SUB1, which is opposed to the counter-substrate CT.

The switching element SW may be of a top-gate type or a bottom-gate type. Although not described in detail, the switching element SW includes a semiconductor layer which is formed of, e.g. polysilicon or amorphous silicon. In the example illustrated, the switching elements SW are covered with an insulative layer IS.

The pixel electrode PE is formed of an electrically conductive material with light transmissivity, such as indium tin oxide (ITO) or indium zinc oxide (IZO). In the example illustrated, the pixel electrodes PE are formed on the insulative layer IS and are electrically connected to the switching elements SW via contact holes formed in the insulative layer IS.

The first alignment film AL1 is disposed on that surface of the array substrate AR, which is opposed to the counter-substrate CT, and extends over almost the entirety of the active area ACT. The first alignment film AL1 covers the pixel electrodes PE. The first alignment film AL1 is formed of a material which exhibits horizontal alignment properties.

On the other hand, the counter-substrate CT is formed by using a second insulative substrate SUB2 having light transmissivity, such as a glass substrate or a plastic substrate. The counter-substrate CT includes a counter-electrode CE and a second alignment film AL2 on that side of the second insulative substrate SUB2, which is opposed to the array substrate AR. Although not shown, a black matrix which partitions each pixel PX, a color filter layer which is disposed to correspond to each pixel PX, and an overcoat layer which relaxes the influence of asperities on the surface of the color filter layer, may be disposed on the counter-substrate CT.

The counter-electrode CE is opposed to each of the pixel electrodes PE. The counter-electrode CE extends over almost the entirety of the active area ACT. The counter-electrode CE is formed of an electrically conductive material with light transmissivity, such as ITO or IZO.

The second alignment film AL2 is disposed on that surface of the counter-substrate CT, which is opposed to the array substrate AR, and extends over almost the entirety of the active area ACT. The second alignment film AL2 covers the counter-electrode CE. The second alignment film AL2 is formed of a material which exhibits horizontal alignment properties.

The first alignment film AL1 and second alignment film AL2 are subjected to rubbing treatment, as will be described later. A first rubbing direction (first alignment treatment direction) of the first alignment film AL1 is substantially perpendicular to a second rubbing direction (second alignment treatment direction) of the second alignment film AL2.

The method for subjecting the first alignment film AL1 and second alignment film AL2 to alignment treatment is not limited to the rubbing treatment, and it is possible to apply optical alignment treatment.

The above-described array substrate AR and counter-substrate CT are disposed such that the first alignment film AL1 and second alignment film AL2 face each other. In this case, a predetermined cell gap is created between the first alignment film AL1 of the array substrate AR and the second alignment film AL2 of the counter-substrate CT by spacers (e.g. columnar spacers which are formed of a resin material so as to be integral with one of the substrates) which are not shown.

The liquid crystal layer LQ is held in the cell gap created between the array substrate AR and the counter-substrate CT, and is disposed between the first alignment film AL1 and second alignment film AL2. The liquid crystal layer LQ includes liquid crystal molecules LM.

A first polarizer PL1 having a first absorption axis is attached by, e.g. an adhesive to the outer surface of the array substrate AR, that is, to the outer surface of the first insulative substrate SUB1 which constitutes the array substrate AR. In addition, a second polarizer PL2 having a second absorption axis, which is perpendicular to the first absorption axis, is attached by, e.g. an adhesive to the outer surface of the counter-substrate CT, that is, to the outer surface of the second insulative substrate SUB2 which constitutes the counter-substrate CT.

In the liquid crystal display device 1 having the above-described structure, the liquid crystal molecules LM included in the liquid crystal layer LQ are aligned with a twist of 90° in a state (initial alignment state) in which no electric field is produced between the pixel electrodes PE and the counter-electrode CE. At this time, a part of backlight from the backlight 4 passes through the first polarizer PL1, passes through the liquid crystal display panel LPN, and then passes through the second polarizer PL2 ("white display").

Meanwhile, in a state in which a vertical electric field is formed between the pixel electrodes PE and the counter-electrode CE, the liquid crystal molecules LM included in the liquid crystal layer LQ are aligned substantially vertical to the major surface of the array substrate AR or the major surface of the counter-substrate CT. At this time, a part of backlight from the backlight 4 passes through the first polarizer PL1, passes through the liquid crystal display panel LPN, and is then absorbed in the second polarizer PL2 ("black display"). In this manner, a normally white mode is realized.

FIG. 4 is a top view which schematically shows a structure of the array substrate AR, which is applicable to the liquid crystal display device 1 of the present embodiment. The structure of the pixel electrodes and the layout of the pixel electrodes are mainly described, and the gate lines G1 to G5 and source lines S are depicted by lines in a simplified manner.

Each of the gate lines G1 to G5 extends in a substantially straight-line shape in a first direction X. Each of the source lines S extends substantially in a second direction Y which is perpendicular to the first direction X, but is bent at a part thereof. The gate lines G1 to G5 (or storage capacitance lines (not shown)) and the source lines S are arranged so as to block light in gaps between the pixel electrodes, and function as a black matrix.

In the example illustrated, the source line S includes a vertical line portion SV extending in the second direction Y; a first oblique line portion SS1 extending in a third direction D3 which crosses the second direction Y at an acute angle counterclockwise (in a leftward rotational direction); and a second oblique line portion SS2 extending in a fourth direction D4 which crosses the second direction Y at an acute angle clockwise (in a rightward rotational direction). Each of an angle θ1 formed between the second direction Y and third direction D3 and an angle θ2 formed between the second direction Y and fourth direction D4 is an angle greater than 0° and less than 90°.

The vertical line portion SV intersects at right angles with the gate lines G1 to G5. The first oblique line portion SS1 extends in a lower right direction (or in an upper left direction) and is positioned between neighboring gate lines, for example, between the gate line C1 and gate line G2, or between the gate line G3 and gate line G4. The second oblique line portion SS2 extends in an upper right direction (or in a lower left direction) and is positioned between neighboring gate lines, for example, between the gate line G2 and gate line G3, or between the gate line G4 and gate line G5.

In this example, it is assumed that a first pixel line PXL1 is formed between the gate line C1 and gate line G2, a second pixel line PXL2 is formed between the gate line G2 and gate line G3, a third pixel line PXL3 is formed between the gate line G3 and gate line G4, and a fourth pixel line PXL4 is formed between the gate line G4 and gate line G5.

Each of the first pixel line PXL1 and third pixel line PXL3 is composed of a plurality of first pixel electrodes PE1 which are arranged in the first direction X. The shape of each of the first pixel electrodes PE1, which constitute the first pixel line PXL1, is identical to the shape of each of the first pixel electrodes PE1, which constitute the third pixel line PXL3. In short, the shapes of the first pixel electrodes PE1, which constitute odd-numbered pixel lines, are all identical.

Each of the second pixel line PXL2 and fourth pixel line PXL4 is composed of a plurality of second pixel electrodes PE2 which are arranged in the first direction X. The shape of each of the second pixel electrodes PE2, which constitute the second pixel line PXL2, is identical to the shape of each of the second pixel electrodes PE2, which constitute the fourth pixel line PXL4. In short, the shapes of the second pixel electrodes PE2, which constitute even-numbered pixel lines, are all identical.

Next, the shapes of the first pixel electrode PE1 and second pixel electrode PE2 are described more concretely.

The first pixel electrode PE1 includes a first oblique electrode portion EC1 which extends in the third direction D3. Specifically, the edge of the first oblique electrode portion EC1 is parallel to the third direction D3 and is parallel to the first oblique line portion SS1. Although not described in detail, the edge of the first oblique electrode portion EC1 is positioned immediately above the first oblique line portion SS1.

In the example illustrated, the first pixel electrode PE1 includes a one-end electrode portion EA1 on one end side of the first oblique electrode portion EC1, and includes an other-end electrode portion EB1 on the other end side of the first oblique electrode portion EC1. Each of the one-end electrode portion EA1 and other-end electrode portion EB1 extends in the second direction Y. Specifically, the edge of each of the one-end electrode portion EA1 and other-end electrode portion EB1 is parallel to the second direction Y and is parallel to the vertical line portion SV. Although not described in detail, the edge of each of the one-end electrode portion EA1 and other-end electrode portion EB1 is positioned immediately above the vertical line portion SV.

The first pixel electrode PE1 of the first pixel line PXL1 and the first pixel electrode PE1 of the third pixel line PXL3 are positioned on the same straight line along the second direction Y. Specifically, the one-end electrode portion EA1 of the first pixel electrode PE1 of the first pixel line PXL1 and the one-end electrode portion EA1 of the first pixel electrode PE1 of the third pixel line PXL3 are positioned on the same straight line along the second direction Y. Similarly, the other-end electrode portion EB1 of the first pixel electrode PE1 of the first pixel line PXL1 and the other-end electrode portion EB1 of the first pixel electrode PE1 of the third pixel line PXL3 are positioned on the same straight line along the second direction Y.

The first pixel electrode PE1, which includes the first oblique electrode portion EC1, one-end electrode portion EA1 and other-end electrode portion EB1, has a substantially "S" shape.

The second pixel electrode PE2 includes a second oblique electrode portion EC2 which extends in the fourth direction D4. Specifically, the edge of the second oblique electrode portion EC2 is parallel to the fourth direction D4 and is parallel to the second oblique line portion SS2. Although not described in detail, the edge of the second oblique electrode portion EC2 is positioned immediately above the second oblique line portion SS2.

In the example illustrated, the second pixel electrode PE2 includes a one-end electrode portion EA2 on one end side of the second oblique electrode portion EC2, and includes an other-end electrode portion EB2 on the other end side of the second oblique electrode portion EC2. Each of the one-end electrode portion EA2 and other-end electrode portion EB2 extends in the second direction Y. Specifically, the edge of each of the one-end electrode portion EA2 and other-end electrode portion EB2 is parallel to the second direction Y and is parallel to the vertical line portion SV. Although not described in detail, the edge of each of the one-end electrode portion EA2 and other-end electrode portion EB2 is positioned immediately above the vertical line portion SV.

The second pixel electrode PE2 of the second pixel line PXL2 and the second pixel electrode PE2 of the fourth pixel line PXL4 are positioned on the same straight line along the second direction Y. Specifically, the one-end electrode portion EA2 of the second pixel electrode PE2 of the second pixel line PXL2 and the one-end electrode portion EA2 of the second pixel electrode PE2 of the fourth pixel line PXL4 are positioned on the same straight line along the second direction Y. Similarly, the other-end electrode portion EB2 of the second pixel electrode PE2 of the second pixel line PXL2 and the other-end electrode portion EB2 of the second pixel electrode PE2 of the fourth pixel line PXL4 are positioned on the same straight line along the second direction Y.

The second pixel electrode PE2, which includes the second oblique electrode portion EC2, one-end electrode portion EA2 and other-end electrode portion EB2, has a substantially "S" shape, which is reverse to the "S" shape of the first pixel electrode PE1.

There is a case in which the shape of each of the first pixel electrodes PE1, which constitute each odd-numbered pixel line, and the shape of each of the second pixel electrodes PE2, which constitute each even-numbered pixel line, are line-symmetry with respect to the straight line along the first direction X. In this case, the angle θ1 of the third direction D3 to the second direction Y is equal to the angle θ2 of the fourth direction D4 to the second direction Y, the length of the first oblique electrode portion EC1 is equal to the length of the second electrode portion EC2, the length of the one-end electrode portion EA1 is equal to the length of the one-end electrode portion EA2, and the length of the other-end electrode portion EB1 is equal to the length of the other-end electrode portion EB2. The one-end electrode portion EA1 and the one-end electrode portion EA2 are positioned on the same straight line along the second direction Y, and the other-end electrode portion EB1 and the other-end electrode portion EB2 are positioned on the same straight line along the second direction Y.

A description is given of a first rubbing direction RB1 of the first alignment film AL1 which covers the first pixel electrodes PE1 and second pixel electrodes PE2 of the above-described layout. In the example illustrated in FIG. 4, the first rubbing direction RB1 is a direction which is set with reference to the third direction D3 and crosses the third direction D3 at an acute angle counterclockwise relative to the third direction D3. An angle θ3 formed between the first rubbing direction RB1 and the third direction D3 is 3.6° or more.

Next, a description is given of a simulation result which is the basis for specifying the formed angle θ3.

Figure 5:
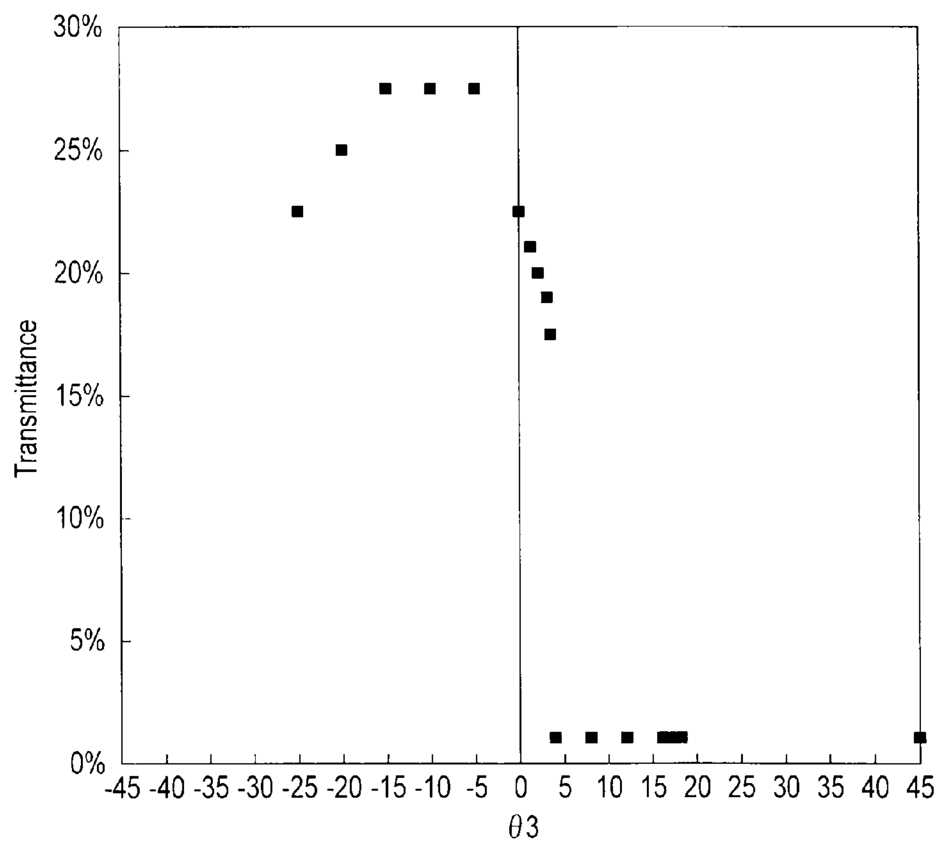
FIG. 5 is a graph which shows a simulation result of a transmittance at a formed angle θ3 at a time when black display is effected in each pixel.

FIG. 5 is a graph which shows a simulation result of a transmittance at the formed angle θ3 at a time when black display is effected in each pixel. The case in which the formed angle θ3 is 0° corresponds to the case in which the first rubbing direction RB1 is parallel to the third direction D3. The case in which the formed angle θ3 is a positive angle corresponds to the case in which the first rubbing direction RB1 crosses the third direction D3 at an acute angle counterclockwise relative to the third direction D3. The case in which the formed angle θ3 is a negative angle corresponds to the case in which the first rubbing direction RB1 crosses the third direction D3 at an acute clockwise relative to the third direction D3. The transmittance is simulated in the range of the formed angle θ3 between −25° and +45°.

According to this simulation, it was confirmed that when the formed angle θ3 is +3.6° or more, the transmittance can fully be decreased. It was also confirmed that when the formed angle θ3 is +45° or less, the transmittance can fully be decreased.

On the other hand, it was confirmed that in the range of the formed angle θ3 between −25° and less than +3.6°, the transmittance is relatively high, despite black display being effected.

Figure 6:
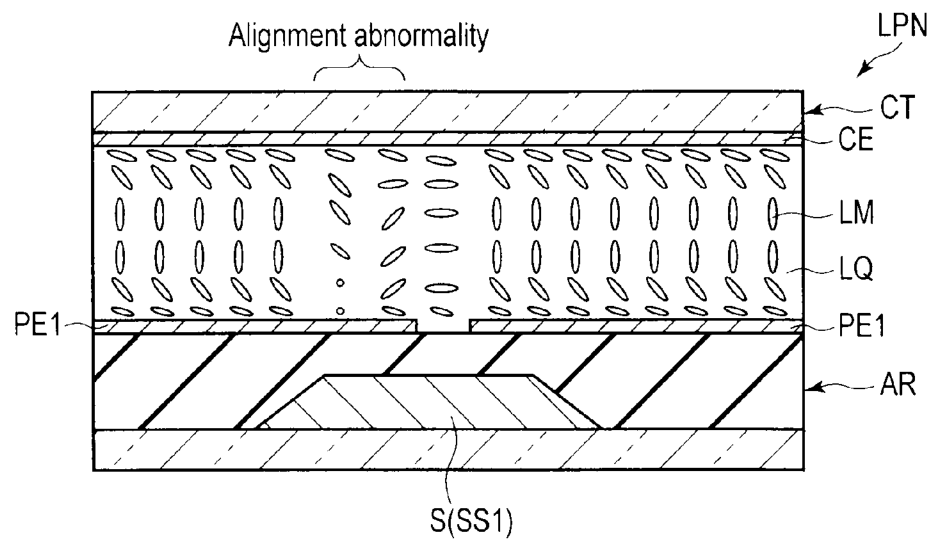
FIG. 6 is a view which schematically illustrates a cross section of the liquid crystal display panel and a state of alignment of liquid crystal molecules at a time when the array substrate shown in FIG. 4 is cut along line A-A', in the case where the formed angle θ3 is in a range of between −25° and less than +3.6°.

FIG. 6 is a view which schematically illustrates a cross section of the liquid crystal display panel LPN and a state of alignment of liquid crystal molecules LM at a time when the array substrate AR shown in FIG. 4 is cut along line A-A', in the case where the formed angle θ3 is in the range of between −25° and less than +3.6°. In this case, the alignment state of liquid crystal molecules in the black display state is illustrated.

The liquid crystal molecules LM are substantially uniformly aligned between the first pixel electrode PE1, which is positioned on the right side of the first oblique line portion SS1 of the source line S, and the counter-electrode CE. On the other hand, between the first pixel electrode PE1, which is positioned on the left side of the first oblique line portion SS1 of the source line S, and the counter-electrode CE, an abnormality in alignment of liquid crystal molecules LM occurs, in particular, in the vicinity of the edge of the first pixel electrode PE1.

A cause of the abnormality in alignment is an interaction between the first rubbing direction of the first alignment film AL1 (not shown), which covers the first pixel electrode PE1, and an undesired transverse electric field (e.g. a transverse electric field between the source line S and the first pixel electrode PE1). If such an interaction affects the liquid crystal molecules LM, the state of alignment of the liquid crystal molecules LM tends to become unstable. Such an abnormality in alignment tends to occur not only in the case of black display, but also in the case where a stress is applied from the outside to the liquid crystal display panel LPN.

Since light leak occurs at the location where the abnormality in alignment occurred, the transmittance increases, despite black display being effected, as illustrated in the above simulation result. In this case, the contrast ratio lowers, as a matter of course, and, in some cases, the viewing angle decreases, leading to degradation in display quality.

Figure 7:
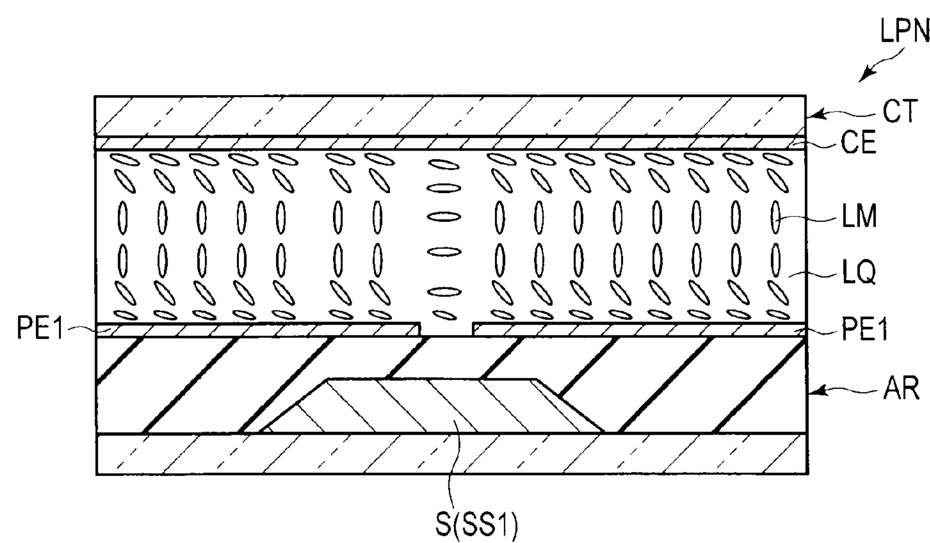
FIG. 7 is a view which schematically illustrates a cross section of the liquid crystal display panel and a state of alignment of liquid crystal molecules at a time when the array substrate shown in FIG. 4 is cut along line A-A', in the case where the formed angle θ3 is in a range of between +3.6° and less than +45°.

FIG. 7 is a view which schematically illustrates a cross section of the liquid crystal display panel LPN and a state of alignment of liquid crystal molecules LM at a time when the array substrate AR shown in FIG. 4 is cut along line A-A', in the case where the formed angle θ3 is in the range of between +3.6° and +45°. In this case, the alignment state of liquid crystal molecules in the black display state is illustrated.

According to the embodiment with this structure, the liquid crystal molecules LM are substantially uniformly aligned between the first pixel electrode PE1, which is positioned on the right side of the first oblique line portion SS1 of the source line S, and the counter-electrode CE. In addition, the liquid crystal molecules LM are substantially uniformly aligned between the first pixel electrode PE1, which is positioned on the left side of the first oblique line portion SS1 of the source line S, and the counter-electrode CE.

Thus, the occurrence of light leak due to an abnormality in alignment can be prevented, and the transmittance can sufficiently be decreased in the black display state, as illustrated in the above simulation result. Therefore, lowering in contrast ratio can be suppressed, and a decrease in viewing angle can be suppressed. Thereby, a liquid crystal display device with a good display quality can be provided.

Next, a modification of the embodiment is described.

Figure 8:
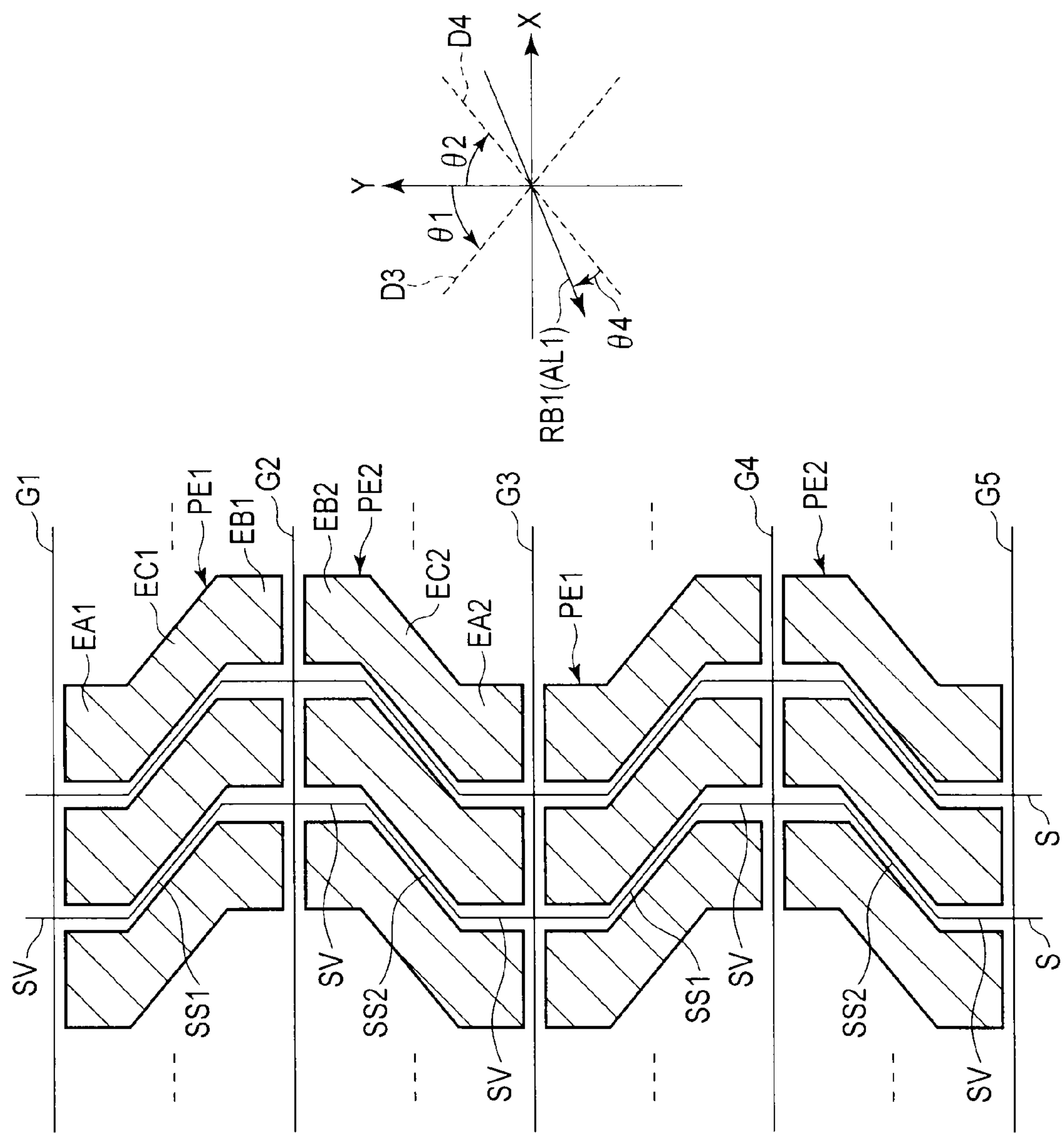
FIG. 8 is a top view which schematically shows another structure of the array substrate which is applicable to the liquid crystal display device of the present embodiment.

FIG. 8 is a top view which schematically shows another structure of the array substrate AR, which is applicable to the liquid crystal display device 1 of the present embodiment. The shapes of the pixel electrodes and the layout of the pixel electrodes are identical to those in the example shown in FIG. 4. The example shown in FIG. 8 differs from the example shown in FIG. 4 with respect to the first rubbing direction RB1 of the first alignment film AL1. In the other respects, the example shown in FIG. 8 is identical to the example shown in FIG. 4, and a description thereof is omitted.

Specifically, the first rubbing direction RB1 of the first alignment film AL1, which covers the first pixel electrodes PE1 and second pixel electrodes PE2, is a direction which is set with reference to the fourth direction D4 crossing the second direction Y at an acute angle clockwise relative to the second direction Y, and which crosses the fourth direction D4 at an acute angle clockwise relative to the fourth direction D4. An angle θ4 formed between the first rubbing direction RB1 and the fourth direction D4 is 3.6° or more.

The transmittance at the formed angle θ4, like the formed angle θ3, was simulated, and a similar result was obtained. In this case, the sign of the formed angle θ4 is reverse to the sign of the formed angle θ3. The case in which the formed angle θ4 is a positive angle corresponds to the case in which the first rubbing direction RB1 crosses the fourth direction D4 at an acute angle clockwise relative to the fourth direction D4. The case in which the formed angle θ4 is a negative angle corresponds to the case in which the first rubbing direction RB1 crosses the fourth direction D4 at an acute angle counterclockwise relative to the fourth direction D4.

The transmittance was simulated in the range of the formed angle θ4 between −25° and +45°. Although the simulation result is not illustrated, it was confirmed that when the formed angle θ4 is +3.6° or more, the transmittance can fully be decreased. It was also confirmed that when the formed angle θ4 is +45° or less, the transmittance can fully be decreased. On the other hand, it was confirmed that in the range of the formed angle θ4 between −25° and less than +3.6°, the transmittance is relatively high, despite black display being effected.

In this modification, like the above-described example, a liquid crystal display device with a good display quality can be provided.

In the present embodiment, as in the examples shown in FIG. 4 and FIG. 8, the description has been given of the case in which each of the first pixel electrodes PE1 and second pixel electrodes PE2 has a substantially "S" shape. Alternatively, the first pixel electrode PE1 may be a parallelogram comprising only the first oblique electrode portion EC1, and the second pixel electrode PE2 may be a parallelogram comprising only the second oblique electrode portion EC2.

As has been described above, according to the present embodiment, there can be provided a liquid crystal display device which has a good display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:

a first substrate comprising a gate line extending in a first direction, a source line comprising an oblique line portion extending in a third direction which crosses at an acute angle a second direction perpendicular to the first direction, a pixel electrode comprising an oblique electrode portion extending in the third direction, and a first alignment film covering the pixel electrode;

a second substrate comprising a counter-electrode which is opposed to the pixel electrode, and a second alignment film covering the counter-electrode; and a liquid crystal layer held between the first substrate and the second substrate, wherein a first rubbing direction of the first alignment film is a direction which crosses the third direction at an acute angle, and an angle formed between the first rubbing direction and the third direction is in a range of between 3.6° and 45°, and the pixel electrode comprises a one-end electrode portion having first edges extending in the second direction only on one end side of the oblique electrode portion, and an other-end electrode portion having second edges extending in the second direction only on the other end side of the oblique electrode portion.

2. The liquid crystal display device of claim 1, wherein the third direction is a direction which crosses the second direction at an acute angle counterclockwise relative to the second direction, and the first rubbing direction is a direction which crosses the third direction at an acute angle counterclockwise relative to the third direction.

3. The liquid crystal display device of claim 1, wherein the third direction is a direction which crosses the second direction at an acute angle clockwise relative to the second direction, and the first rubbing direction is a direction which crosses the third direction at an acute angle clockwise relative to the third direction.

4. The liquid crystal display device of claim 1, wherein a second rubbing direction of the second alignment film is substantially perpendicular to the first rubbing direction.

5. The liquid crystal display device of claim 1, further comprising a first polarizer which is disposed on an outer surface of the first substrate and has a first absorption axis, and a second polarizer which is disposed on an outer surface of the second substrate and has a second absorption axis which is perpendicular to the first absorption axis.

6. A liquid crystal display device comprising:

a first pixel line which is composed of a plurality of first pixel electrodes arranged in a first direction, each of the first pixel electrodes comprising a first oblique electrode portion extending in a third direction which crosses a second direction, which is perpendicular to the first direction, at an acute angle counterclockwise relative to the second direction;

a second pixel line which neighbors the first pixel line and is composed of a plurality of second pixel electrodes arranged in the first direction, each of the second pixel electrodes comprising a second oblique electrode portion extending in a fourth direction which crosses the second direction at an acute angle clockwise relative to the second direction;

a first alignment film covering each of the first pixel electrodes and each of the second pixel electrodes;

a counter-electrode which is opposed to each of the first pixel electrodes and each of the second pixel electrodes;

a second alignment film covering the counter-electrode; and a liquid crystal layer held between the first alignment film and the second alignment film, wherein a first rubbing direction of the first alignment film is a direction which crosses the third direction at an acute angle counterclockwise relative to the third direction, and an angle formed between the first rubbing direction and the third direction is in a range of between 3.6° and 45°, the first pixel electrode comprises a first one-end electrode portion having first edges extending in the second direction only on one end side of the first oblique electrode portion, and a first other-end electrode portion having second edges extending in the second direction only on the other end side of the first oblique electrode portion, and the second pixel electrode comprises a second one-end electrode portion having third edges extending in the second direction only on one end side of the second oblique electrode portion, and a second other-end electrode portion having fourth edges extending in the second direction only on the other end side of the second oblique electrode portion.

7. The liquid crystal display device of claim 6, wherein a second rubbing direction of the second alignment film is substantially perpendicular to the first rubbing direction.

8. The liquid crystal display device of claim 6, further comprising a first polarizer which is disposed on an outer surface of a first substrate and has a first absorption axis, and a second polarizer which is disposed on an outer surface of a second substrate and has a second absorption axis which is perpendicular to the first absorption axis.

9. A liquid crystal display device comprising:

a first pixel line which is composed of a plurality of first pixel electrodes arranged in a first direction, each of the first pixel electrodes comprising a first oblique electrode portion extending in a third direction which crosses a second direction, which is perpendicular to the first direction, at an acute angle counterclockwise relative to the second direction;

a second pixel line which neighbors the first pixel line and is composed of a plurality of second pixel electrodes arranged in the first direction, each of the second pixel electrodes comprising a second oblique electrode portion extending in a fourth direction which crosses the second direction at an acute angle clockwise relative to the second direction;

a first alignment film covering each of the first pixel electrodes and each of the second pixel electrodes;

a counter-electrode which is opposed to each of the first pixel electrodes and each of the second pixel electrodes;

a second alignment film covering the counter electrode; and a liquid crystal layer held between the first alignment film and the second alignment film, wherein a first rubbing direction of the first alignment film is a direction which crosses the fourth direction at an acute angle clockwise relative to the fourth direction, and an angle formed between the first rubbing direction and the fourth direction is in a range of between 3.6° and 45°, the first pixel electrode comprises a first one-end electrode portion extending in the second direction only on one end side of the first oblique electrode portion, and a first other-end electrode portion extending in the second direction only on the other end side of the first oblique electrode portion, and the second pixel electrode comprises a second one-end electrode portion extending in the second direction only on one end side of the second oblique electrode portion, and a second other-end electrode portion extending in the second direction only on the other end side of the second oblique electrode portion.

10. The liquid crystal display device of claim 9, wherein a second rubbing direction of the second alignment film is substantially perpendicular to the first rubbing direction.

11. The liquid crystal display device of claim 9, further comprising a first polarizer which is disposed on an outer surface of a first substrate and has a first absorption axis, and a second polarizer which is disposed on an outer surface of a second substrate and has a second absorption axis which is perpendicular to the first absorption axis.

* * * * *